(12) United States Patent
Hani et al.

(10) Patent No.: US 8,630,798 B2
(45) Date of Patent: Jan. 14, 2014

(54) ELECTRONIC SYSTEM AND METHOD FOR PERSONAL NAVIGATION

(75) Inventors: Mohammad Bani Hani, Niles, IL (US); Rog Ady, Chicago, IL (US); Frank Forest, Lake Villa, IL (US)

(73) Assignee: Motorola Mobility LLC, Libertyville, IL (US)

( * ) Notice: Subject to any disclaimer, the term of this patent is extended or adjusted under 35 U.S.C. 154(b) by 273 days.

(21) Appl. No.: 13/076,919

(22) Filed: Mar. 31, 2011

(65) Prior Publication Data

US 2012/0253663 A1  Oct. 4, 2012

(51) Int. Cl.
*G01S 5/14* (2006.01)
*G01C 21/16* (2006.01)
*G06F 19/00* (2011.01)

(52) U.S. Cl.
USPC .............. 701/408; 701/412; 342/357.02

(58) Field of Classification Search
USPC ......... 701/408, 412, 433, 468, 469, 431, 480; 342/357.02; 455/556.1
See application file for complete search history.

(56) References Cited

U.S. PATENT DOCUMENTS

| | | | | |
|---|---|---|---|---|
| 5,430,654 | A | * | 7/1995 | Kyrtsos et al. ............... 701/470 |
| 6,094,625 | A | * | 7/2000 | Ralston .......................... 702/150 |
| 6,122,595 | A | * | 9/2000 | Varley et al. .................. 701/469 |
| 6,452,544 | B1 | * | 9/2002 | Hakala et al. ............ 342/357.31 |
| 6,700,533 | B1 | * | 3/2004 | Werb et al. .............. 342/357.48 |
| 2005/0273258 | A1 | | 12/2005 | MacNeille et al. |
| 2006/0184318 | A1 | * | 8/2006 | Yoshimine .................... 701/209 |
| 2007/0001898 | A1 | | 1/2007 | Twitchell, Jr. et al. |
| 2008/0040951 | A1 | * | 2/2008 | Kates .............................. 36/136 |
| 2010/0057359 | A1 | | 3/2010 | Caballero et al. |
| 2010/0299066 | A1 | * | 11/2010 | Liu et al. ........................ 701/215 |
| 2011/0187640 | A1 | * | 8/2011 | Jacobsen et al. .............. 345/156 |
| 2012/0176411 | A1 | * | 7/2012 | Huston .......................... 345/633 |

FOREIGN PATENT DOCUMENTS

WO  2004109232 A2  12/2004

OTHER PUBLICATIONS

Azuma, R., et al, A Motion-Stabilized Outdoor Augmented Reality System, HRL Laboratories, Malibu, CA; IEEE Xplore, Oct. 21, 2008; 8 pages.
Fang, L., et al, Design of a Wireless Assisted Pedestrian Dead Reckoning System—The NavMote Experience; IEEE Transactions on Instrumentation and Measurement, vol. 54, No. 6, Dec. 2005; 17 pages.
Renaudin, V. et al, Hybridization of MEMS and Assisted GPS for Pedestrian Navigation, www.insideGNSS.com; Jan./Feb. 2007; 5 pages.
Patent Cooperation Treaty, "PCT Search Report and Written Opinion of the International Searching Authority" for International Application No. PCT/US2012/025842 dated Jun. 29, 2012, 19 pages.

* cited by examiner

*Primary Examiner* — Tan Q Nguyen

(57) ABSTRACT

An electronic system for providing personal navigation assistance to a user includes a first mobile electronic device having a first GPS module for generating first GPS data and an INS module for generating INS data, and a second mobile electronic device having a second GPS module for generating second GPS data. A wireless communication link allows for communication of data between the first electronic device and the second electronic device. A processor combines the first GPS data, the second GPS data, and the INS data to produce calculated location data indicative of the location of a user at each of a plurality of times. An output component provides personal navigation assistance to a user based on the calculated location data, such as audio instructions.

17 Claims, 6 Drawing Sheets

ELECTRONIC SYSTEM AND METHOD FOR PERSONAL NAVIGATION

FIELD OF THE INVENTION

The present invention relates to an electronic system and corresponding method for providing personal navigation assistance to a user.

BACKGROUND

Portable electronic devices such as mobile phones, smart phones, personal digital assistants (PDAs), and tablets have become popular and ubiquitous. More and more features have been added to these devices, such as navigation applications for vehicles or individuals, which often rely on GNSS (Global Navigation Satellite Systems) signal reception and processing functionality. GNSS is a standard generic term for satellite navigation systems that provide geo-spatial positioning signals with global coverage, and which include a plurality of satellites which orbit the earth in extremely precise orbits and can transmit radio signals to any of a number of GNSS receiving modules. One well-known fully operational GNSS is the United States' Global Positioning System (GPS), formally known as NAVSTAR. An electronic device with a GPS module having an antenna and receiver allows a location (longitude, latitude, and altitude) to be determined using the signals transmitted from four or more GPS satellites, which signals also indicate an accurate corresponding time. Using geometric triangulation, the three known positions can be used to determine a two dimensional location (latitude and longitude). Obtaining a signal from a fourth satellite can allow a calculation of a three-dimensional location (latitude, longitude and altitude).

The satellite signals can be problematic in that a line-of-sight from a satellite to the receiver is required, and can be blocked by various obstructions such as tall buildings, certain land features, and within buildings.

Navigation applications can also take advantage of other systems for sensing location. For example, an inertial navigation system (INS) can include an inertial measurement unit (IMU), which uses a combination of accelerometers and gyroscopes to measure position, velocity, orientation (attitude), and gravitational forces on a vehicle or individual. In general, an IMU works by detecting acceleration using one or more accelerometers, and by detecting changes in rotational attributes like pitch, roll, and yaw using one or more gyroscopes. Relative position and orientation can then be computed using a method known as dead reckoning. Such a method can be problematic in that the data is relative and measurement errors are cumulative.

Electronic systems having both GPS functionality and INS functionality are known, and combining GPS data and INS data can provide a more accurate determination of location.

DETAILED DESCRIPTION

An electronic system including two electronic devices can provide personal navigational assistance to a user, such as a user who is walking or running along a predetermined desired route. For example, the electronic system can include a first electronic device with a GPS module and an INS module in communication with a second electronic device with a GPS module. Data from the INS module can be useful to compute location when sufficient GPS data is unobtainable and/or inaccurate. The first electronic device can be a body mounted mobile device, such as a headset, and the second electronic device can be a handheld mobile phone. Communication between the first and second electronic devices can be achieved via any one of a number of known short range wireless protocols, such as Bluetooth or WiFi. A processor of the electronic system is operable to calculate location data by combining data from the different modules in various ways.

In some cases, the processor can combine data from these modules in a redundant manner in order to improve accuracy of the calculated location at each of various points. In some cases, the desired route can be determined and/or mapped in one of the electronic devices, such as the second mobile device (mobile phone) and the other electronic device (headset) can provide directions to the user to stay on the route according to the determined location data. For example, the calculated location data can be used to determine directions which can be provided in an audio form to an output component of the electronic system, such as one or more speakers of a headset of an electronic device, to provide personal navigation assistance to the user in a manner that does not require looking at a display screen. The GPS data from a single device or both devices can be used in location calculations. Such an electronic system is also an improvement over a single handheld electronic device combining GPS data and INS data because movement of a user's hand carrying the device while running would mean that the INS data would correspond to both movement of the hand and travel movement of the user, and signal processing would be needed to resolve the user travel movement only. In this regard, a more rigid frame of reference for the INS module, such as in a headset or attached to a user's trunk, allows for simpler detection of user movement.

In some cases, the processor can make an assessment of the accuracy of the GPS data corresponding to the first and/or second electronic devices, such that if the accuracy is above a predetermined threshold, one of the GPS modules can be powered off, and GPS data from only a single GPS module is used in the calculation of the location data. In this manner, a power drain on the electronic system can be minimized.

Figure 1:
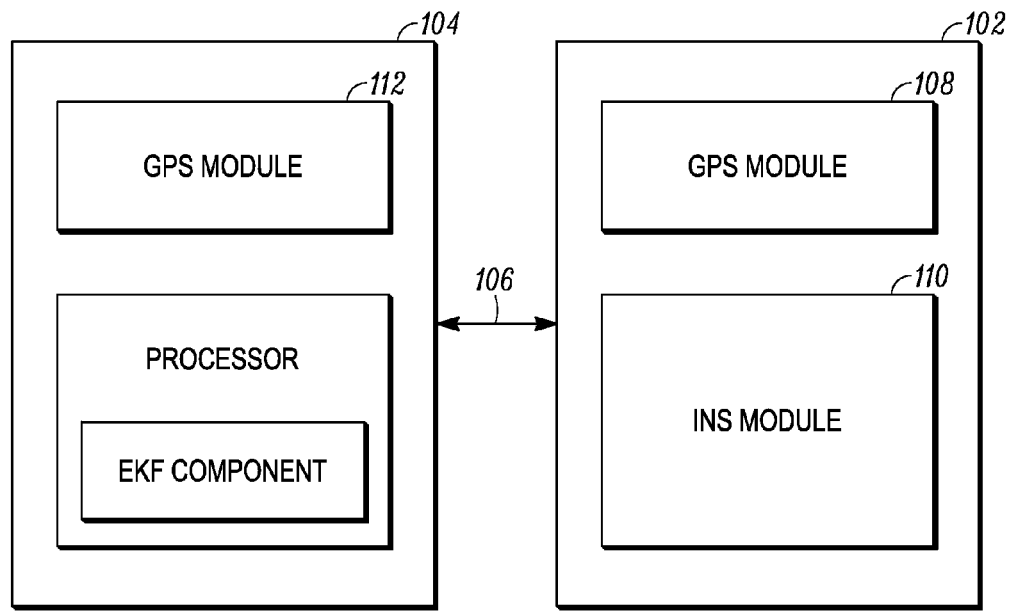
FIG. 1 is a simplified block diagram of an exemplary portable electronic system for personal navigation.
Figure 2:
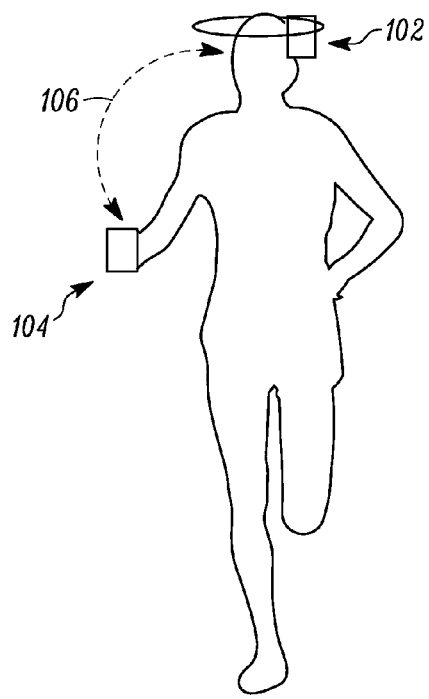
FIG. 2 is an illustration of placement of devices of an exemplary electronic system.

More specifically, as shown in FIGS. 1-2, an exemplary electronic system 100 includes first and second electronic devices 102, 104, and a communication link 106 for communicating data between these devices. The first electronic device 102 can take the form of a headset (as more fully described with respect to FIG. 4), and the second electronic device 104 can take the form of a mobile phone (as more fully described with respect to FIG. 3), which can include functions such as navigation, calling, emailing, texting, and interne browsing functions, as well as others. In other embodiments, the first or second electronic device can be one of a variety of other electronic devices such as a personal digital assistant, though preferably the first electronic device with the INS module is mounted on a user's head or trunk in a relatively rigid manner such that its orientation is substantially stable when a user is walking or running.

In some cases, the first electronic device 102 includes a first GPS module 108 and an INS module 110 in the form of an IMU unit, which can incorporate MEMS (micro-electro-mechanical system) devices such as accelerometers and gyroscopes. In some cases, the first electronic device 102 does not include a GPS module but only an INS module 110. The second electronic device 104 includes a GPS module 112.

Each GPS module 108, 112 includes a GPS antenna and receiver, and is associated with a memory and a processor so as to be operable to receive signals from a plurality of satellites, calculate GPS data such as position and velocity, and provide additional GPS error data such as GPS pseudo ranges and range rates. The INS module 110 is operable to calculate acceleration and orientation data, along with additional error data, and this data can also be time-stamped so as to be accurately matched to corresponding GPS data.

In particular, each GPS module 108, 112 can operate by scanning radio frequencies for GPS satellite signals, and upon receiving a radio signal from a GPS satellite, the device can determine the precise location of that satellite using one of various conventional methods, along with an associated time. A device can continue scanning for signals until it has acquired at least three different satellite signals, and can calculate a location and speed of the device by triangulation for example or other known methods. However, the signals from the various modules can also be combined, such as described below, to determine location and/or speed data.

Figure 3:
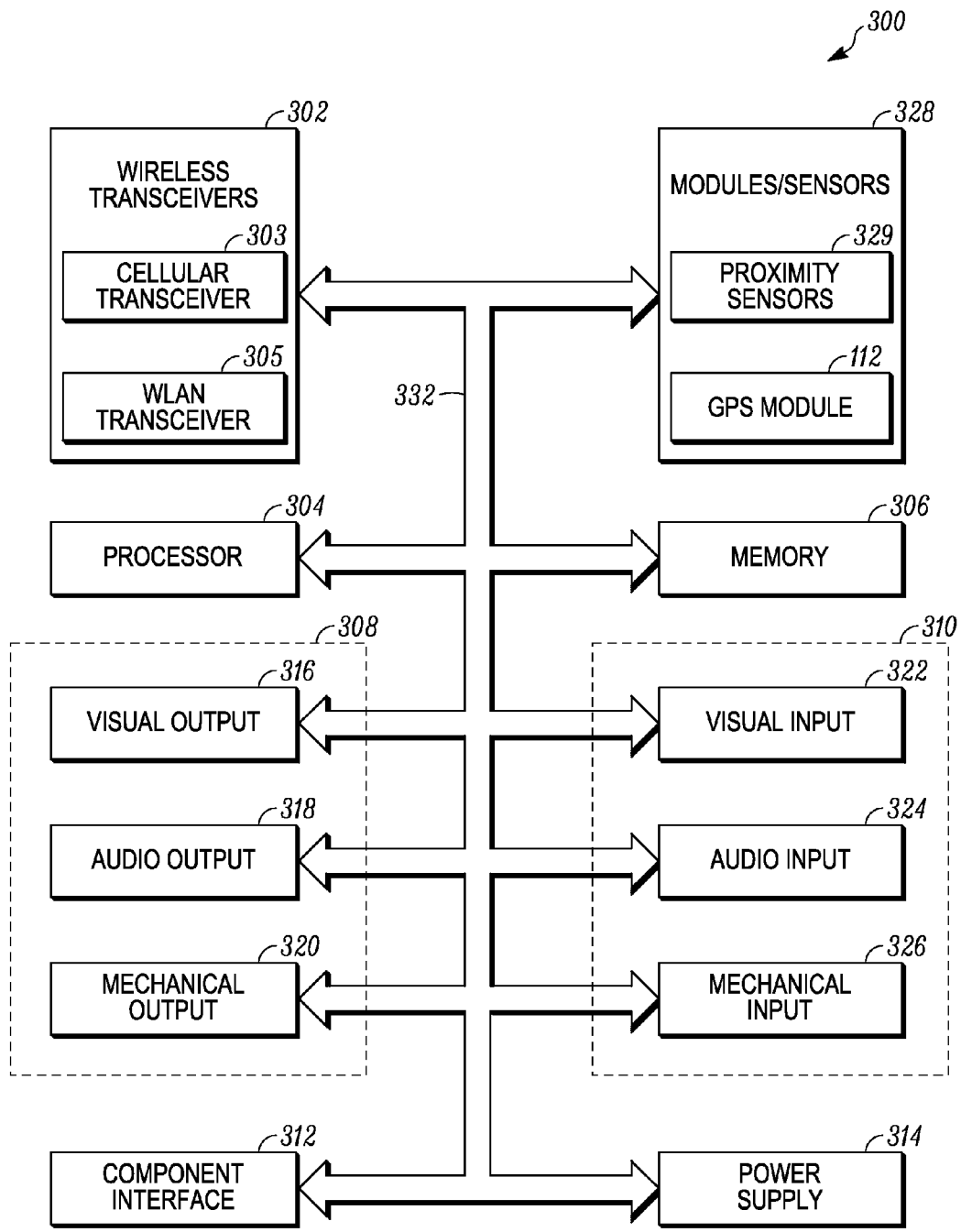
FIG. 3 is a more detailed block diagram of an exemplary electronic device in the form of a mobile phone.

Referring to FIG. 3, a block diagram 300 illustrates in more detail exemplary internal components of a mobile smart phone implementation of the second electronic device 104. These components can include wireless transceivers 302, a processor 304 (e.g., a microprocessor, microcomputer, application-specific integrated circuit, or the like), memory 306, one or more output components 308, one or more input components 310, and one or more modules/sensors 328, such as proximity sensors 329, and GPS module 112, or other sensors such as an accelerometer, a gyroscope, or any other sensor that can provide pertinent information, such as to identify a current location or orientation of the device 302. The GPS module 112 can include a GPS antenna, receiver, memory, and processor.

The device can also include a component interface 312 to provide a direct connection to auxiliary components or accessories for additional or enhanced functionality, and a power supply 314, such as a battery, for providing power to the other internal components. All of the internal components can be coupled to one another, and in communication with one another, by way of one or more internal communication links 332 such as an internal bus.

More specifically, the wireless transceivers 302 can include both cellular transceivers 303 and a wireless local area network (WLAN) transceiver 305. Each of the wireless transceivers 302 utilizes a wireless technology for communication, such as cellular-based communication technologies including analog communications (using AMPS), digital communications (using CDMA, TDMA, GSM, iDEN, GPRS, EDGE, etc.), and next generation communications (using UMTS, WCDMA, LTE, IEEE 802.16, etc.) or variants thereof, or peer-to-peer or ad hoc communication technologies such as HomeRF, Bluetooth and IEEE 802.11(a, b, g or n), or other wireless communication technologies.

The memory 306 can encompass one or more memory devices of any of a variety of forms (e.g., read-only memory, random access memory, static random access memory, dynamic random access memory, etc.), and can be used by the processor 304 to store and retrieve data. The data that is stored by the memory 306 can include operating systems, applications, and informational data. Each operating system includes executable code that controls basic functions of the electronic device, such as interaction among the various internal components, communication with external devices via the wireless transceivers 302 and/or the component interface 312, and storage and retrieval of applications and data to and from the memory 306. Each application includes executable code that utilizes an operating system to provide more specific functionality for the communication devices, such as file system service and handling of protected and unprotected data stored in the memory 306. Informational data is non-executable code or information that can be referenced and/or manipulated by an operating system or application for performing functions of the communication device.

Exemplary operation of the wireless transceivers 302 in conjunction with others of the internal components of the electronic device 104 can take a variety of forms and can include, for example, operation in which, upon reception of wireless signals, the internal components detect communication signals and the transceiver 302 demodulates the communication signals to recover incoming information, such as voice and/or data, transmitted by the wireless signals. After receiving the incoming information from the transceiver 302, the processor 304 formats the incoming information for the one or more output components 308. Likewise, for transmission of wireless signals, the processor 304 formats outgoing information, which may or may not be activated by the input components 310, and conveys the outgoing information to one or more of the wireless transceivers 302 for modulation as communication signals. The wireless transceiver(s) 303 can convey the modulated signals to a remote device, such as via a cell tower or an access point (not shown), and wireless transceiver 305 can convey the modulated signals to a device within close range.

The input and output components 308 can include a variety of visual, audio, and/or mechanical outputs. For example, the output components 308 can include one or more visual output components 316 such as a display screen (e.g., a liquid crystal display screen), one or more audio output components 318 such as a speaker, alarm, and/or buzzer, and one or more mechanical output components 320 such as a vibrating mechanism. Similarly, the input components can include mechanical input components such as a touch screen formed as part of the display screen, and/or a keypad having numerous keys for inputting various user commands for operation of the device. Other input components 310 can include one or more visual input components 322 such as an optical sensor of a camera, one or more audio input components 324 such as a microphone. Actions that can actuate one or more input components 310 can include for example, opening the electronic device, unlocking the device, moving the device, and operating the device.

Figure 4:
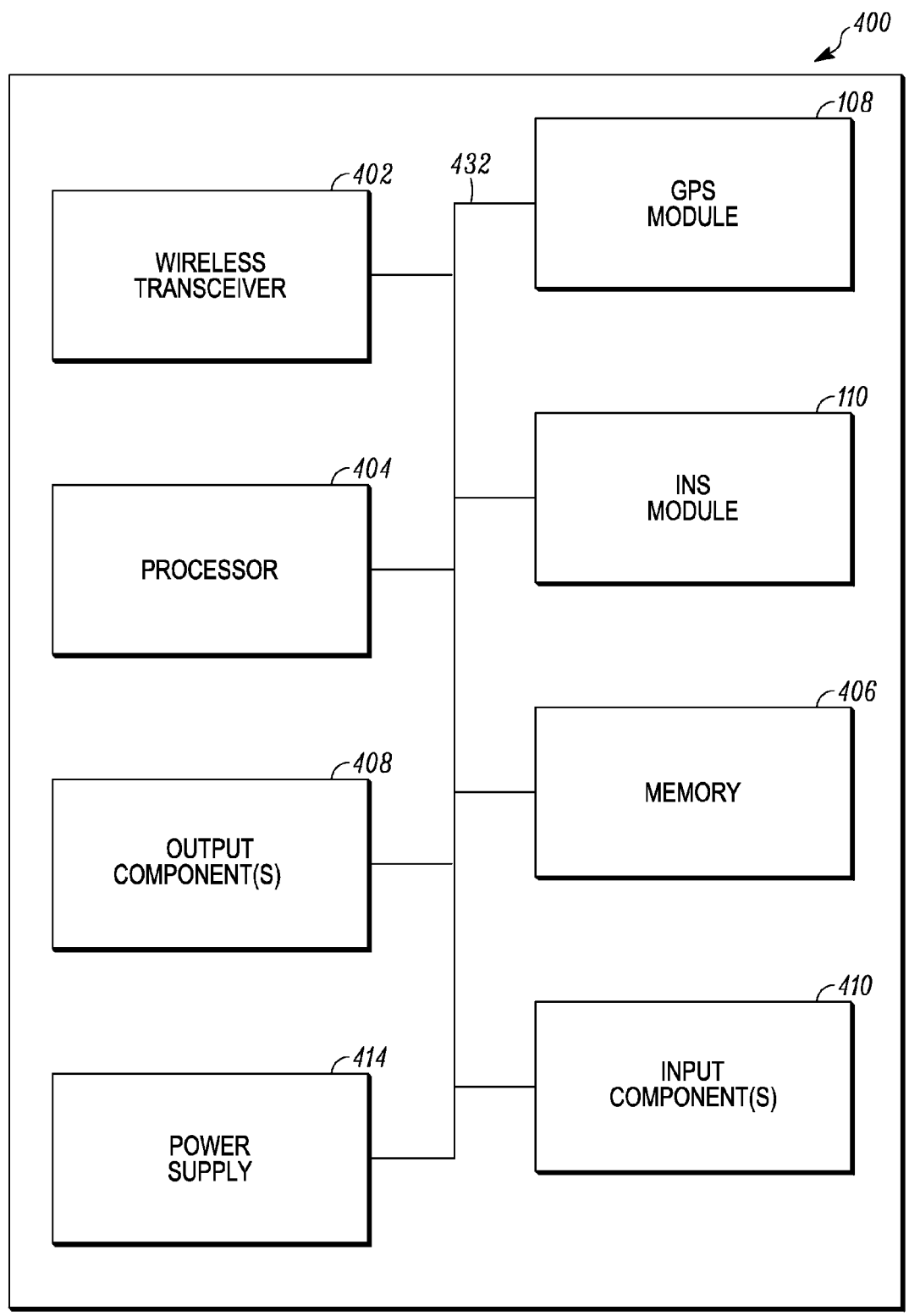
FIG. 4 is a more detailed block diagram of an exemplary electronic device in the form of a headset.

Referring to FIG. 4, a block diagram 400 illustrates in more detail exemplary internal components of a headset implementation of the first electronic device 102. These components can include wireless local area network transceivers 402 for short range communication, a processor 404, memory 406, power supply 414, and communication link 432, similar to components such as described above. Further, the electronic device 102 can include one or more output components 408 such as speakers for audio outputs, one or more input components 410 such as control buttons or a keypad, and one or more modules/sensors, such as GPS module 108 and INS module 110.

The first and second electronic devices 102 and 104 can be in short range communication with each other to wirelessly transmit data therebetween, where the data can include GPS data, INS data, desired route data, location data, map data, etc. The devices 102, 104 and respective processors 304, 404 can be programmed to perform various methods such as those described below, and can include various applications for performing a wide variety of functions. For example, device 104 can include a GPS application for mapping and/or displaying a desired route, and can be placed in a navigation mode for acquiring GPS data and tracking the location of the device. Similarly, device 102 can include a GPS application and can be placed in a navigation mode for acquiring GPS data and INS data and tracking the location of the device. Further, processor 304 and/or processor 404 can include an extended Kalman Filter (EKF) which can be used for combining GPS data with INS data, such as is described in "Hybridization of MEMS and Assisted GPS for Pedestrian Navigation" from InsideGNSS (January/February 2007).

Figure 5:
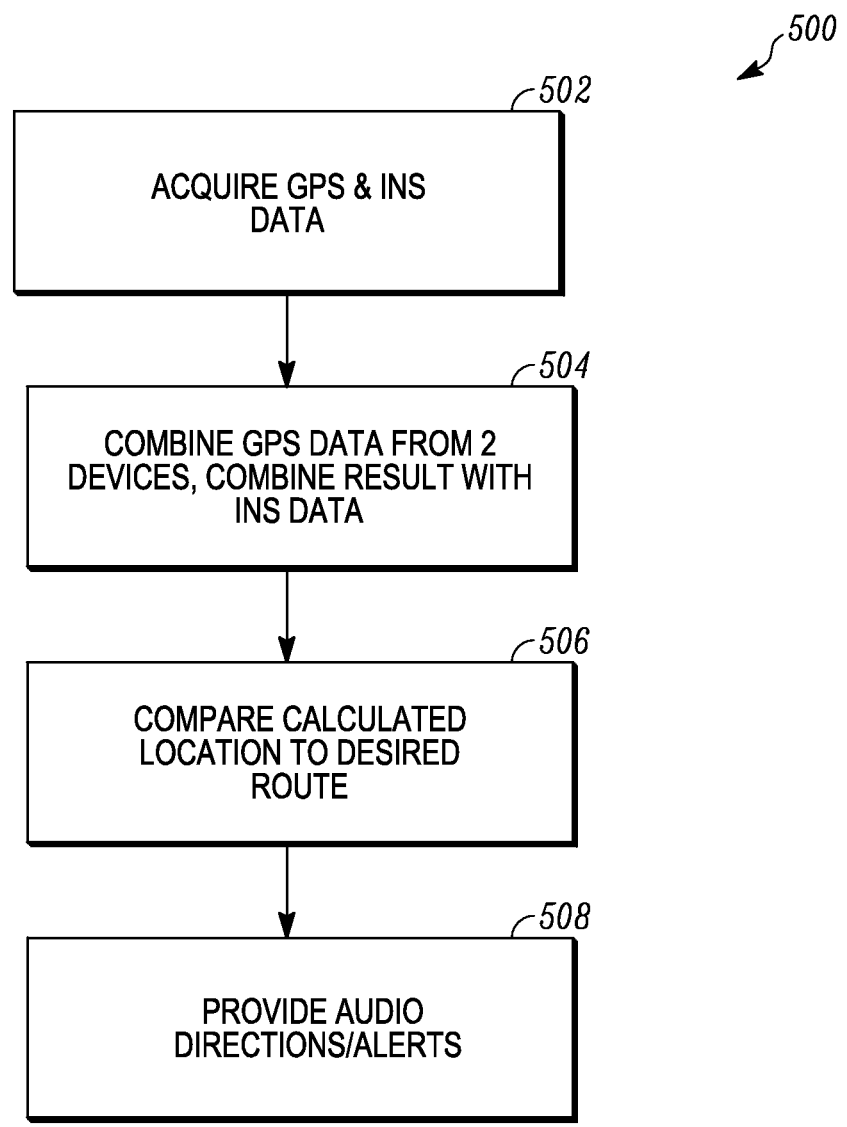
FIG. 5 is a flowchart showing steps of an exemplary method that can be performed by the electronic system of FIGS. 1-2.

Referring to FIG. 5, flowchart 500 shows steps of an exemplary method that can be performed by the electronic system of FIGS. 1-2 and which uses GPS data in a redundant manner. The method starts at a step 502, with a desired route having been defined via a GPS application such as in the second electronic device 104, and with each electronic device in a navigation mode for tracking the location of a user. The first electronic device 102 acquires first GPS data and INS data at a plurality of times, and the second electronic device 104 acquires second GPS data at a plurality of times. At a step 504, GPS data from both devices is combined, such as by interpolating (if necessary) the GPS data associated with one device to obtain data points corresponding to the same respective times for which GPS data exists for the other device. Then corresponding GPS data from the two devices can be averaged to obtain hybrid GPS data at a plurality of times. Next the hybrid GPS data can be combined with the INS data in an EKF according to known algorithms, to obtain location data corresponding to the position of a user at each of a plurality of times, along with attitude data. The INS data alone can be used to calculate a relative position with respect to a previous position when corresponding GPS data is not available. At a step 506, calculated locations are compared to the desired route, and if necessary, deviations noted and/or anticipatory directions determined. At a step 508, the deviations and/or anticipatory directions are converted to an audio output, and communicated to electronic device 102 (if necessary), and an audio output is provided via output component 408 based on the calculated locations, with alerts provided when deviations occur and/or audio directions provided to guide the user along the desired route. Process 500 can be exited at any time by an appropriate input command by a user.

Figure 6:
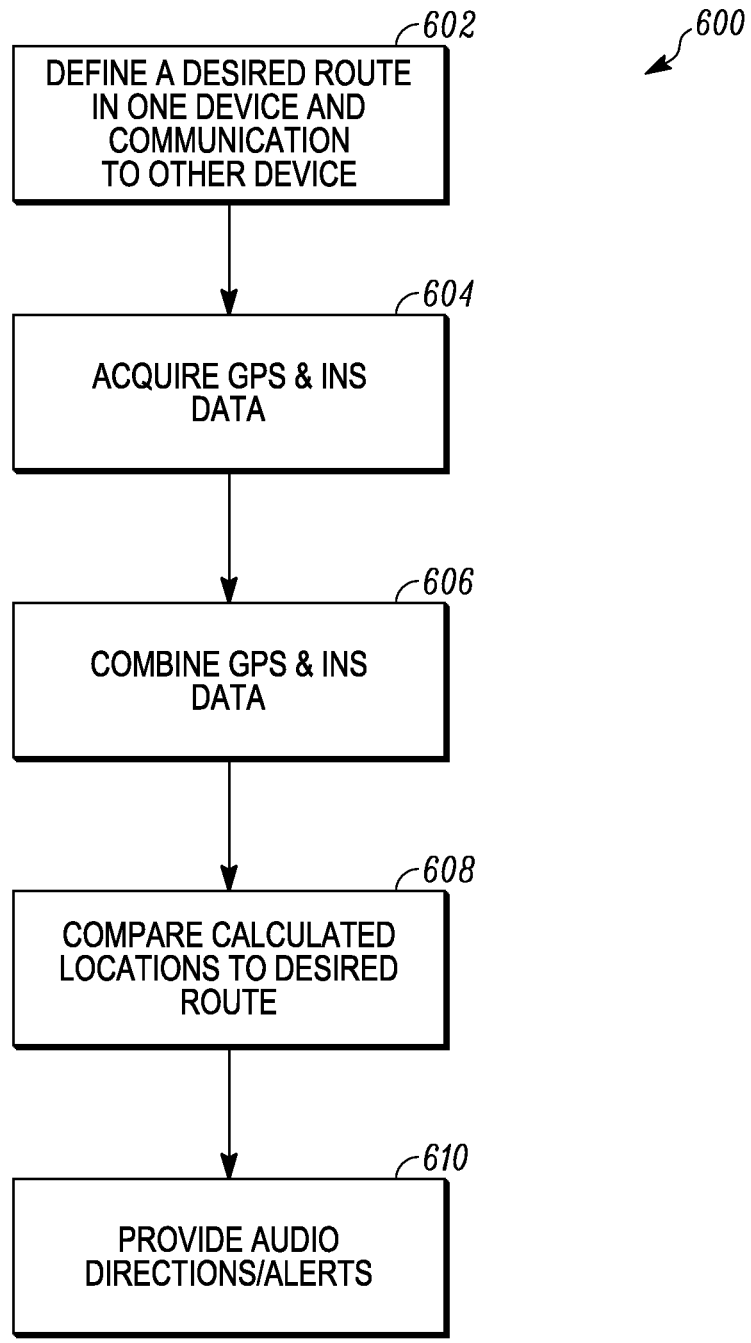
FIG. 6 is a flowchart showing steps of another exemplary method that can be performed by the electronic system of FIGS. 1-2.

Referring to FIG. 6, flowchart 600 shows steps of another exemplary method that can be performed by the electronic system of FIGS. 1-2, wherein a desired route is defined by one electronic device and management of determined locations with respect to the desired route is accomplished by the other device. In particular, the method starts at a step 602, with a desired route being defined in the second electronic device 104, and the desired route being communicated to the first electronic device 102, which can then be placed in a navigation mode for tracking the location of a user. At a step 604, the first electronic device 102 acquires first GPS data and INS data at a plurality of times. Optionally, the second electronic device can obtain second GPS data to be used in the location determination. At a step 606, the first GPS data and/or the second GPS data can be combined with the INS data in an EKF, to obtain location data corresponding to the position of a user at each of a plurality of times. Attitude data can also be calculated. At a step 608, the first electronic device 102 compares the calculated locations to the desired route. At a step 610, an audio output is provided via output component 408 based on the calculated locations, with alerts provided when deviations occur and/or audio directions provided to guide the user along the desired route. Process 600 can be exited at any time by an input command by an appropriate input command.

Figure 7:
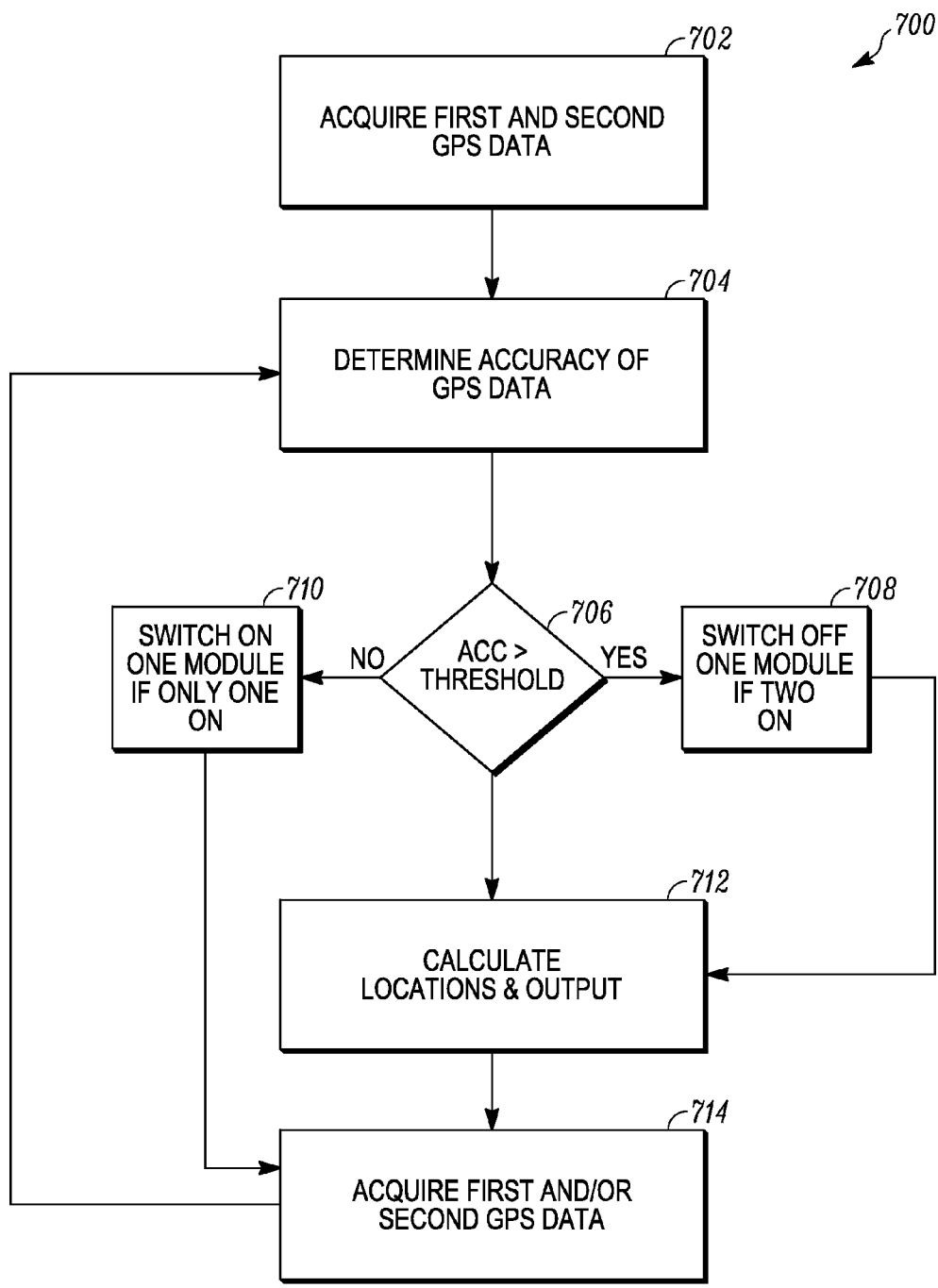
FIG. 7 is a flowchart showing steps of a further exemplary method that can be performed by the electronic system of FIGS. 1-2.

Referring to FIG. 7, flowchart 700 shows steps of a further exemplary method that can be performed by the electronic system of FIGS. 1-2 and which operates to determine when one of the GPS modules 108, 112 can be turned off. The method starts with a desired route defined such as in the electronic device 104, and both devices 102, 104 being in a navigation mode for tracking the location of a user. At a step 702, first GPS data from the first electronic device 102 and second GPS data from the second electronic device 104 are acquired at a plurality of times. The first electronic device 102 can optionally also acquire INS data. At a step 704, an accuracy of the first GPS data and/or the second GPS data is determined, such as by determining from how many satellites signals are received, or by evaluating the stability of successive data points. At a step 706, a determination is made as to whether or not an accuracy of an electronic device is (or both electronic devices are) greater than a predetermined accuracy threshold. If so, then processing proceeds to a step 708, and if not processing proceeds to a step 710.

At step 708, one of the GPS modules (if both are on) can be switched off in order to minimize power consumption. For example, if the first GPS data is determined to have an accuracy above a predetermined threshold, then the GPS module 112 of the second electronic device 104 can be switched off. If both the first and the second GPS data are determined to have an accuracy above a predetermined threshold, then either GPS module can be switched off, and processing then proceeds to a step 712.

At step 710, if only one GPS module is on, then the other module is also switched on, and processing then proceeds to a step 714.

At step 712, the first GPS data and/or the second GPS data can be combined with the INS data in an EKF, to obtain location data corresponding to the position of a user at each of a plurality of times, and an output indicative of the location data can be provided. For example, an audio output can be provided via output component 408 based on the calculated locations, with alerts provided when deviations occur and/or audio directions provided to guide the user along the desired route.

At step 714, GPS data is acquired from each GPS module that is on at a plurality of times, and processing then loops back to step 704. Process 700 can be exited at any time by an input command by a user to stop the process.

It is specifically intended that the present invention not be limited to the embodiments and illustrations contained herein, but include modified forms of those embodiments, including portions of the embodiments and combinations of elements of different embodiments as come within the scope of the following claims.

We claim:

1. An electronic system for providing personal navigation assistance to a user, the electronic system comprising:

a first mobile electronic device having a first GPS module for generating first GPS data and an INS module for generating INS data, wherein the first electronic device is a headset;

a second mobile electronic device having a second GPS module for generating second GPS data, wherein the second electronic device is a phone;

a wireless communication link for communicating data between the first electronic device and the second electronic device;

a processor for combining the first GPS data, the second GPS data, and INS data to produce calculated location data indicative of the location of a user at each of a plurality of times;

wherein the processor is a component of one of the first electronic device and the second electronic device; and an output component for providing personal navigation assistance to a user based on the calculated location data.

2. The electronic system of claim 1, wherein the output component includes a speaker of the first electronic device for providing audio directions to a user to maintain a desired route, and wherein alerts are provided when deviations occur.

3. The electronic system of claim 1, wherein the second electronic device includes a display screen for displaying the location data on a map.

4. The electronic system of claim 1, wherein the processor includes an extended Kalman filter.

5. The electronic system of claim 1, wherein the wireless communication link is implemented as a wireless local area network.

6. An electronic system for tracking the location of a user, the system comprising:

a first mobile electronic device having a first GPS module for generating first GPS data and an INS module generating INS data, wherein the first electronic device is a headset;

a second mobile electronic device having a second GPS module for generating second GPS data and operable to create a desired route in response to user input, wherein the second electronic device is a phone;

a wireless communication link for transmitting the desired route between the first electronic device and the second electronic device;

a processor for combining the first GPS data and INS module data to produce calculated location data indicative of the location of a user at each of a plurality of times; and an output component of the first electronic device for providing personal navigation assistance based on the calculated location data and based on the desired route, wherein the personal navigation assistance is in the form of audio directions to a user to maintain the desired route, and wherein alerts are provided when deviations occur, wherein the processor is for determining an accuracy of at least one of the first GPS data and the second GPS data and providing a control instruction to turn off at least one of the first GPS module and the second GPS module based on the determined accuracy.

7. The electronic system of claim 6, wherein the second electronic device includes a display screen for displaying the location data on a map.

8. The electronic system of claim 6, wherein the processor includes an extended Kalman filter.

9. The electronic system of claim 6, wherein the wireless communication link is implemented according to a Bluetooth or WiFi protocol.

10. The electronic system of claim 6, wherein the calculated location data also takes into account the second GPS data.

11. An electronic system for providing personal navigation assistance to a user, the electronic system comprising:

a first electronic device having a first GPS module generating first GPS data and an INS module generating INS data;

a second electronic device having a second GPS module generating second GPS data;

a wireless communication link for transmitting data between the first electronic device and the second electronic device;

a processor for determining an accuracy of at least one of the first GPS data and the second GPS data and providing a control instruction to turn off at least one of the first GPS module and the second GPS module based on the determined accuracy, the processor for determining calculated location data indicative of the location of a user at each of a plurality of times using at least one of the first GPS data and the second GPS data; and an output component for providing personal navigation assistance to a user based on the calculated location data.

12. The electronic system of claim 11, wherein the processor is a component of the second electronic device and includes an extended Kalman filter for combining the INS module data with at least one of the first GPS data and the second GPS data to produce the calculated location data.

13. The electronic system of claim 11, wherein the first electronic device is a headset, and the personal navigation assistance is in the form of audio directions to a user to maintain a desired route.

14. The electronic system of claim 13, wherein the second electronic device includes a display screen for displaying the location data on a map, and wherein alerts are provided when deviations occur.

15. A method for providing personal navigation assistance to a user, the method comprising:

providing a first mobile electronic device having a first GPS module generating first GPS data and an INS module generating INS data, and a second mobile electronic device having a second GPS module generating second GPS data, with a wireless communication link for communicating data between the first electronic device and the second electronic device;

in a processor, combining the INS data with at least one of the first GPS data and the second GPS data to produce calculated location data indicative of the location of a user at each of a plurality of times;

providing personal navigation assistance to a user based on the calculated location data; and determining a GPS accuracy of at least one of the first GPS data and the second GPS data and limiting the combining to GPS data from only one of the first electronic device and the second electronic device if the determined accuracy is above a predetermined threshold.

16. The method of claim 15, further including determining, by the second electronic device, a desired route to be displayed on a map on a display screen, and wherein the providing personal navigation assistance to a user includes providing audio directions to a user by the first electronic device.

17. The method of claim 16, wherein the first mobile electronic device is a headset, wherein the second mobile electronic device is a phone, and wherein alerts are provided when deviations occur.

* * * * *